Oct. 14, 1924.  
T. H. WILLSON  
1,511,553  
HEATING UNIT FOR RADIATORS  
Filed Nov. 30, 1923
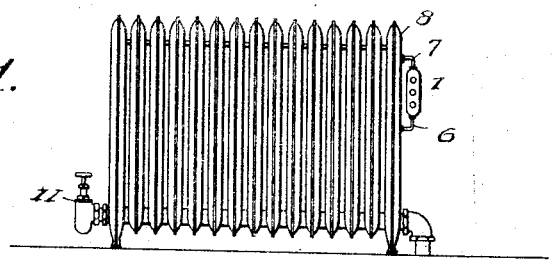
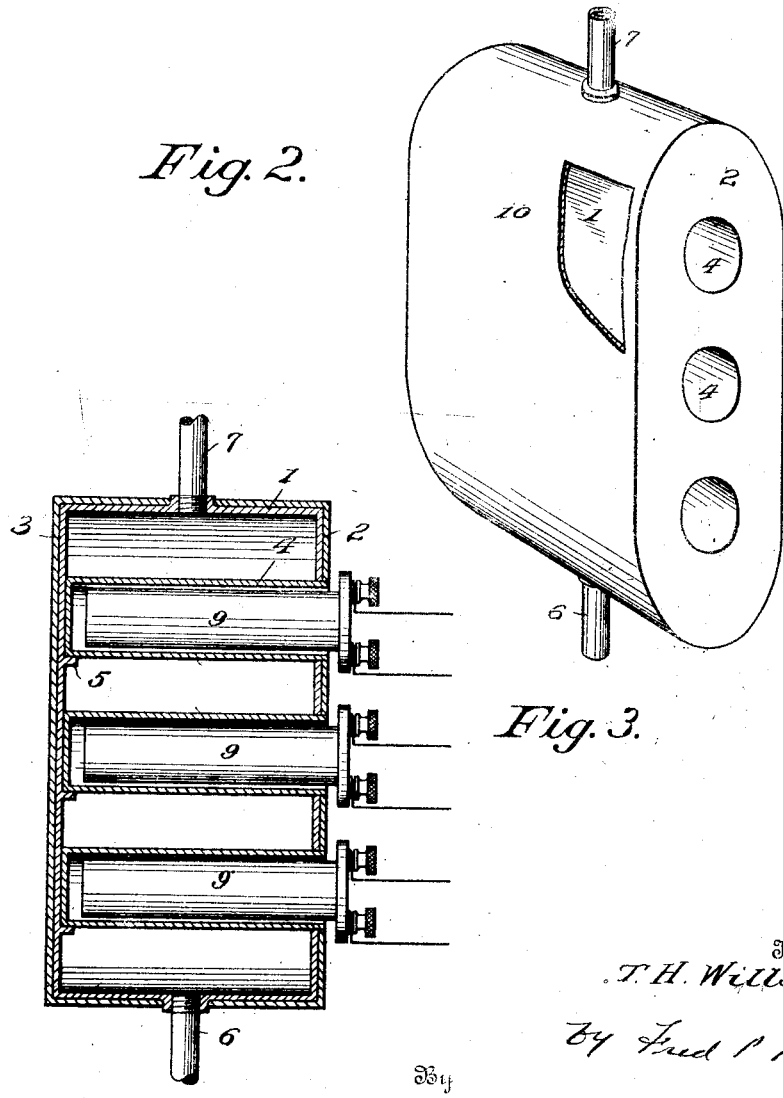
Inventor  
T. H. Willson Patented Oct. 14, 1924.

1,511,553

UNITED STATES PATENT OFFICE.

THOMAS H. WILLSON, OF SEATTLE, WASHINGTON.

HEATING UNIT FOR RADIATORS.

Application filed November 30, 1923. Serial No. 677,762.

*To all whom it may concern:*

Be it known that THOMAS H. WILLSON, a citizen of the United States, residing at Seattle, in the county of King and State of Washington, has invented certain new and useful Improvements in Heating Units for Radiators, of which the following is a specification.

This invention relates to an improvement in hot water heating systems, being particularly directed to a heater adapted to be connected with a hot water radiator and to be in open circulatory communication with the radiator, the heater being adapted to receive one or more heating units, whereby the water may be heated and caused to circulate through the radiator for the radiation of the desired heat.

The invention is more particularly directed to a heater comprising a casing having an inlet and outlet, whereby it may be put in circulatory communication with a radiator or the like, the heater casing having a plurality of sleeve-like receptacles closed against the interior of the casing but open to the outside of the casing, the receptacles being designed to receive electric heating elements for imparting heat to the water in the casing and thereby inducing a circulation of the heated water through the radiator in the well known manner.

In the drawings:

Fig. 1 is a view in elevation showing a radiator with the improved heater connected therewith.

Fig. 2 is an enlarged perspective view of the heater.

Fig. 3 is a vertical sectional view through the heater, the electrical heating elements being shown in position.

The improved heater comprises a casing 1, which may be of any shape, though preferably of elongated oval form in edge view, as shown. The casing has what may be termed a forward wall 2 preferably flat, and a similar flat rear wall 3, and the forward wall is provided with a plurality of cylindrical or other formed receptacles 4, which are open at their forward ends and closed at their rear ends and supported upon ledges 5 on the rear wall of the casing. The open ends of these receptacles extend through the forward wall of the casing and are secured therein to seal the interior of the receptacles against the interior of the casing. The casing 1 is provided with inlet and outlet pipes 6 and 7 which are tapped into an ordinary radiator 8 so that the radiator and casing are in open circulatory communication.

Electric heaters of any type, indicated generally at 9, are adapted to be introduced at will into the receptacles 4, in order to heat the water contained in the casing and thereby cause a circulation through the radiator of the heated water for the obvious heating effect. The casing or heater proper is preferably covered with asbestos as 10, or other non-heat conducting material to conserve the heat.

It is preferable that initially a plurality of electric heaters be used in order to quickly raise the temperature of the water, and following a desired temperature, the heaters may be in part withdrawn or cut off with only sufficient heat remaining to maintain the water at the desired temperature.

Obviously, the heating element may be applied to a radiator which forms a part of an otherwise complete hot water heating system, and with the valve 11 operated to cut off the particular radiator from the general system, that particular radiator may be heated by the present heater in order to give the desired local heat. Or, if preferable, and as contemplated, the heating feature may be formed by an independent radiator coupled with the present heater and such radiator may, if desired, be portable to be moved from place to place.

The heater proper is preferably constructed of sheet metal and will be in sufficient size to contain a proper body of water to permit raising the heat of the water in the radiator without undue delay.

Claim:

A heater comprising a casing of elongated oval shape having inlet and outlet pipes leading from the respective ends thereof, said casing having a flat forward wall and being formed with a plurality of interior superimposed receptacles opening through the front wall and extending into contact with the rear wall, said receptacles being of materially less diameter than the width of the casing and being wholly closed against the interior of the casing, the receptacles being adapted to permit the independent insertion and removal of heating means.

In testimony whereof I affix my signature in the presence of two witnesses.

THOMAS H. WILLSON.

Witnesses:
J. M. ROTH.
W. L. BARCLAY.